US008274483B2

(12) United States Patent
Kanki

(10) Patent No.: US 8,274,483 B2
(45) Date of Patent: Sep. 25, 2012

(54) REMOTE CONTROL SIGNAL-USING DEVICE, REMOTE CONTROL SIGNAL-USING METHOD, CAR NAVIGATION APPARATUS, AND DISPLAY APPARATUS

(75) Inventor: Kenichiro Kanki, Fukuoka (JP)

(73) Assignee: Panasonic Corporation, Osaka (JP)

( * ) Notice: Subject to any disclaimer, the term of this patent is extended or adjusted under 35 U.S.C. 154(b) by 432 days.

(21) Appl. No.: 12/160,580

(22) PCT Filed: Dec. 15, 2006

(86) PCT No.: PCT/JP2006/325030

§ 371 (c)(1),
(2), (4) Date: Jul. 19, 2010

(87) PCT Pub. No.: WO2007/083466

PCT Pub. Date: Jul. 26, 2007

(65) Prior Publication Data

US 2010/0283738 A1 Nov. 11, 2010

(30) Foreign Application Priority Data

Jan. 19, 2006 (JP) ................................ 2006-011593

(51) Int. Cl.
*G06F 3/041* (2006.01)

(52) U.S. Cl. ....................................... 345/173; 345/156

(58) Field of Classification Search ........... 345/156–184
See application file for complete search history.

(56) References Cited

U.S. PATENT DOCUMENTS

| | | | | |
|---|---|---|---|---|
| 6,442,952 | B2 | 9/2002 | Roh et al. | |
| 2001/0054291 | A1 | 12/2001 | Roh et al. | |
| 2002/0186203 | A1 * | 12/2002 | Huang | 345/157 |
| 2005/0096812 | A1 * | 5/2005 | Nezu et al. | 701/36 |
| 2005/0267676 | A1 * | 12/2005 | Nezu et al. | 701/200 |
| 2006/0025920 | A1 * | 2/2006 | Nezu et al. | 701/200 |
| 2007/0297064 | A1 * | 12/2007 | Watanabe et al. | 359/630 |
| 2008/0100591 | A1 * | 5/2008 | Nezu et al. | 345/173 |

FOREIGN PATENT DOCUMENTS

CN 1330331 1/2002

(Continued)

OTHER PUBLICATIONS

Machine translation of JP,05-336397, published on Dec. 17, 1993.*

(Continued)

*Primary Examiner* — Amare Mengistu
*Assistant Examiner* — Dmitriy Bolotin
(74) *Attorney, Agent, or Firm* — Wenderoth, Lind & Ponack, L.L.P.

(57) ABSTRACT

The present invention utilizes a remote control signal for transmitting commands respectively from a remote controller and a touch panel. A signal generator generates a second remote control signal from a two-dimensional coordinate value signal (touch panel output). The second remote control signal does not overlap a first remote control signal (remote controller output). The remote control signal includes first one-byte data and second one-byte data. The first remote control signal exists on first portion that is defined as a group of points. These points exist on a diagonal of two-dimensional coordinate. The second remote control signal is transmitted via a cable. Processor performs remote control processing upon being the first remote control signal and performs a touch panel processing upon being the second remote control signal.

10 Claims, 8 Drawing Sheets

FOREIGN PATENT DOCUMENTS

| | | |
|---|---|---|
| CN | 1386012 | 12/2002 |
| JP | 2-219083 | 8/1990 |
| JP | 5-336397 | 12/1993 |
| JP | 10-275070 | 10/1998 |
| JP | 2001-109579 | 4/2001 |
| JP | 2003-283866 | 10/2003 |
| JP | 2005-128791 | 5/2005 |

OTHER PUBLICATIONS

International Search Report issued Jan. 16, 2007 in the International (PCT) Application No. PCT/JP2006/325030.

* cited by examiner

REMOTE CONTROL SIGNAL-USING DEVICE, REMOTE CONTROL SIGNAL-USING METHOD, CAR NAVIGATION APPARATUS, AND DISPLAY APPARATUS

TECHNICAL FIELD

The present invention relates to an apparatus for using remote control signals, a method for using remote control signals, and a car navigation apparatus. More particularly, the present invention relates to technology for utilizing a remote control signal for transmitting commands respectively from a remote controller and a touch panel.

BACKGROUND ART

A car navigation apparatus has been known in the past, which deals with commands originating from a remote controller. A car navigation apparatus is coming to practical use, which has a touch panel placed on a display panel to issue commands in the touch panel as well as in the remote controller. Thus car navigation apparatus has to meet two technical requirements toward practice use.

Firstly, a car navigation apparatus needs a system that distinguishes touch panel commands and remote controller commands to deal with each commands.

Secondly, a car navigation apparatus, which has a conventional remote control interface, newly needs an interface differing from the remote control interface to connect a touch screen display to a main unit thereof. The touch screen display has a display device and a touch panel. The touch panel is placed on the display device. The different interface is put between the main unit and the display device and deals with commands from the touch panel.

However, the second requirement brings increase of interface. This increase brings high cost, and complication of connection.

There are two documents that disclose usage of a touch panel. Document 1 (Published Japanese patent application H02-219083) discloses technologies for turning off software keys (GUI) used for a touch panel placed on a display panel upon leaving the touch panel not operated during a predetermined time. Document 2 (Published Japanese patent application 2005-128791) discloses technologies for switching from a current screen to other screen for remote control upon receiving commands from a remote controller during display of software keys.

However, the disclosed technologies have no difference from the car navigation apparatus that is coming to practical use, in the point of requiring an interface differing from the remote control interface.

The disclosed technologies do not enable a car navigation apparatus to switch automatically a remote controller command processing and a touch panel command processing. In other words, a screen is not switched until a user purposefully operates something or operates nothing.

According to Document 1, a user needs waiting with operating nothing during the predetermined time. According to Document 2, a user has to operate a remote controller only to switch from a current screen to a control screen.

DISCLOSURE OF INVENTION

Problem(s) to be Solved by Invention

The present invention provides a remote control signal-using apparatus, a remote control signal-using method and other related technologies that switch properly screens without user operation and additional interfaces.

Means for Solving Problem(s)

Firstly, the present invention provides an apparatus for using remote control signals. This apparatus includes a display panel, a touch panel, a receiver, a signal generator, a code analyzer, a remote control processor, and a touch panel operation processor. The signal generator generates a second remote control signal from a two-dimensional coordinate value signal. The second remote control signal is not overlapping a first remote control signal. The first remote control signal is transmitted from a remote controller to the receiver. The two-dimensional coordinate value signal is outputted from the touch panel in response to touch. The touch panel is placed on the display panel. The code analyzer analyzes a remote control signal originating from the receiver or the signal generator to determine if the remote control signal is the first remote control signal or the second remote control signal. The remote control processor performs remote control processing depending on the remote control signal if the remote control signal is the first remote control signal. On the other hand, the touch panel operation processor performs a touch panel processing depending on the remote control signal if the remote control signal is the second remote control signal.

In the first aspect of the present invention, a remote control signal can be used for transmitting commands respectively from a remote controller and a touch panel. Thus will bring no needs for increase of interface and limit the cost increase. Moreover, it will be advantageous that adding a touch panel operation function to a car navigation apparatus requires only changing control programs or slightly changing circuits.

Analysis for determining if the remote control signal is the first remote control signal or the second remote control signal enables a car navigation apparatus to switch automatically a remote controller command processing and a touch panel command processing. In other words, a user operates nothing for only switching a screen. This will improve operability in the car navigation apparatus.

Secondly, in addition to the first aspect of the present invention, the remote control signal includes first one-byte data and second one-byte data. The first remote control signal exists on first portion that is defined as a group of points. These points exist on a diagonal of two-dimensional coordinate. This coordinate consists of the first one-byte data and the second one-byte data. The diagonal has a first endpoint consisting of a minimum value of the first one-byte data and a maximum value of the second one-byte data. The diagonal also has a second endpoint consisting of a maximum value of the first one-byte data and a minimum value of the second one-byte data.

In the second aspect of the present invention, it is enabled that the first remote control signal and the second remote control signal are clearly distinguished from each other. Moreover, the second remote control signal will have second portion that is larger than the first portion. Therefore, the second remote control signal will enable transmitting in enough data amount.

Thirdly, in addition to the second aspect of the present invention, the first remote control signal has the first one-byte data, and has the second one-byte data used to error-correct the first one-byte data thereof.

In the third aspect of the present invention, the second one-byte data will correct a transmission error in the wireless communication.

Fourthly, in addition to the second aspect of the present invention, the second remote control signal has a set of the first one-byte data and the second one-byte data. The set indicate a two-dimensional coordinate value corresponding to the two-dimensional coordinate value signal.

Fifthly, in addition to the fourth aspect of the present invention, the second remote control signal is transmitted via a cable.

In the fourth and fifth aspect of the present invention, the set of the first one-byte data and the second one-byte data will indicate a two-dimensional coordinate value of the touch panel. In this case, the second one-byte data will not be used for the error-correction. However, transmitting the second remote control signal via the cable can bring practically no needs for the error-correction. Therefore, data is transmitted with no difficulty.

Sixthly, in addition to the first aspect of the present invention, the two-dimensional coordinate value is corrected to avoid a predetermined special coordinate value. The predetermined special coordinate value indicates being the second remote control signal.

In the sixth aspect of the present invention, the correction will avoid concordance between the two-dimensional coordinate value and the predetermined special coordinate value. Moreover, the predetermined special coordinate value enables conveying that the second remote control signal is assigned to touch panel operation.

Seventhly, in addition to sixth aspect of the present invention, the predetermined special coordinate value is a coordinate value indicating an edge portion of the touch panel.

In the seventh aspect of the present invention, a coordinate value assigned to the predetermined special coordinate value will corresponds to a portion which is hardly touched by a user. Thus enables rational communication.

Eighthly, in addition to sixth aspect of the present invention, the predetermined special coordinate value is used in supplying an electric power to the touch panel.

In the eighth aspect of the present invention, the receiving side of the remote control signal can automatically determine whether the touch panel is operated or not. Thus improves operability for a user.

Effect of Invention

According to the present invention, a remote control signal can be used for transmitting commands respectively from a remote controller and a touch panel. Thus will bring no needs for increase of interface and limit the cost increase. A user operates nothing for only switching a screen. This will improve operability in the car navigation apparatus.

DESCRIPTION OF SYMBOLS

Figure 1:
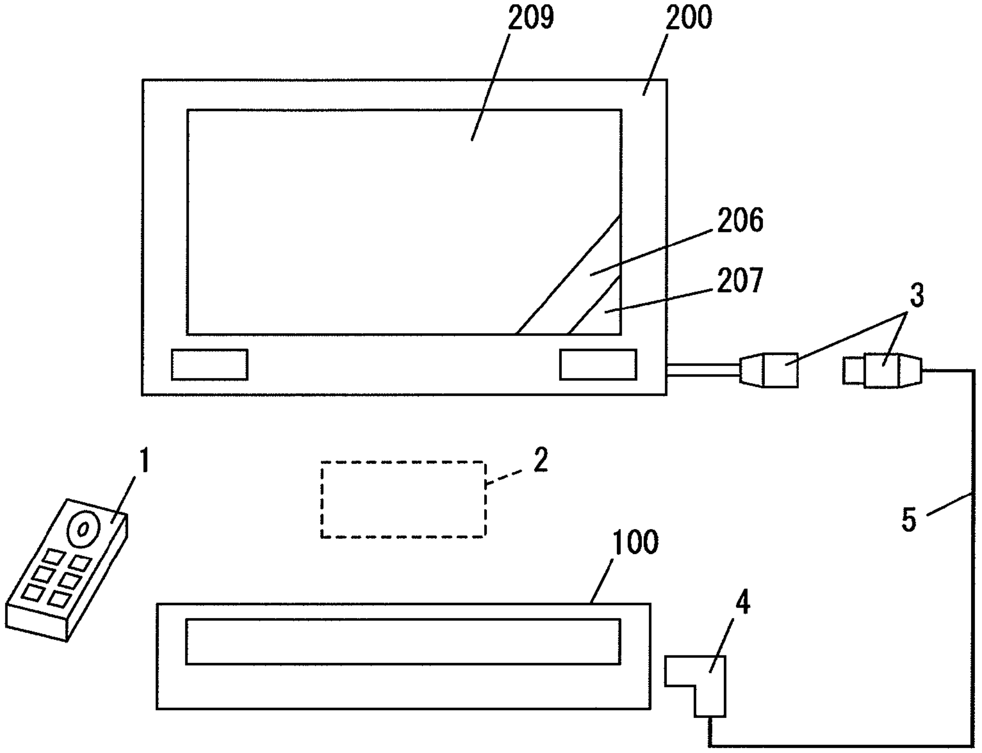
FIG. 1 illustrates an appearance of a car navigation apparatus of a first embodiment of the present invention.

1: remote controller
2: power source
3, 4: connector
5: cable
10: custom-code field
11: first data code field
12: second data code field
13: end code field
100, 300: main unit
101: controller
102: main memory
103: interface
104: hard disk
105: disk drive
106: removable medium
107: remote control processor
108: touch panel operation processor
109; 211; 301: selector
110: code analyzer
200; 400: display apparatus
201: supply switch
202: supply circuit
203: controller
204: A/D converter
205: panel driver
206: display panel
207: light source
208: light source drive circuit
209: touch panel
210: signal generator
212: receiver
213: A/D converter
214: demodulator
215: amplifier
216: loud speaker

BEST MODE OF CARRYING OUT THE INVENTION

First Embodiment

Embodiments of the present invention will be explained referring to the accompanying drawings in the following.

FIG. 1 illustrates an appearance of a car navigation apparatus of a first embodiment of the present invention. A car navigation apparatus of the first embodiment separates into a main unit 100 and a display apparatus 200.

The main unit 100 can link to the display apparatus 200 mechanically. A remote controller 1 is readied for remote control. A power source 2 is a battery of a car with which the car navigation apparatus is equipped.

The main unit 100 and the display apparatus 200 have respectively a connector 4 and a connector 3. The connector 3 is connected to the connector 4 by a cable 5 that transmits a remote control signal generated by the remote controller 1.

It is enough if the main unit 100 connects to the display apparatus 200 electrically. The main unit 100 may be connected to the display apparatus 200 by not limited to the connector 3, the connector 4 and the cable 5.

The display apparatus 200 has a display panel 206 that displays images. The display panel 206 is placed in the back of a touch panel 209. In other words, the touch panel 209 is placed in the front of the display apparatus 200 (overlaying). The touch panel 209 generates a signal indicating a two-dimensional coordinate value in response to touch. The placed in the back of the touch panel 209 is a light source 207 that emits backlight. The backlight is transmissive throughout the display panel 206 and the touch panel 209.

The touch panel 209 is preferably composed of transparent or translucent material, for better viewing of images displayed on the display panel 206 placed in the back of the touch panel 209. It is enough if the touch panel detects a two-dimensional coordinate (X-Y coordinate) value corresponding to a touch position in enough accuracy. The type of detection can be selected arbitrarily. The preferred type is as follows: an electromagnetic induction detection type, an electric resistance detection type, an electrostatic capacity detection type, a pressure detection type, etc.

The display panel 206 preferably is to be flat. The preferred is as follows: a liquid crystal display, an organic electroluminescence display, a plasma display, a Surface conduction Electron emitter Display (SED), etc. Considering capability of expression, the display panel 206 preferably requires a capability of a color display. Of course, according to the theoretical standpoint, a monochrome display may be included in the present invention. Furthermore, the light source will not be required if a self-light-emitting type panel is used as the display panel 206.

Figure 2:
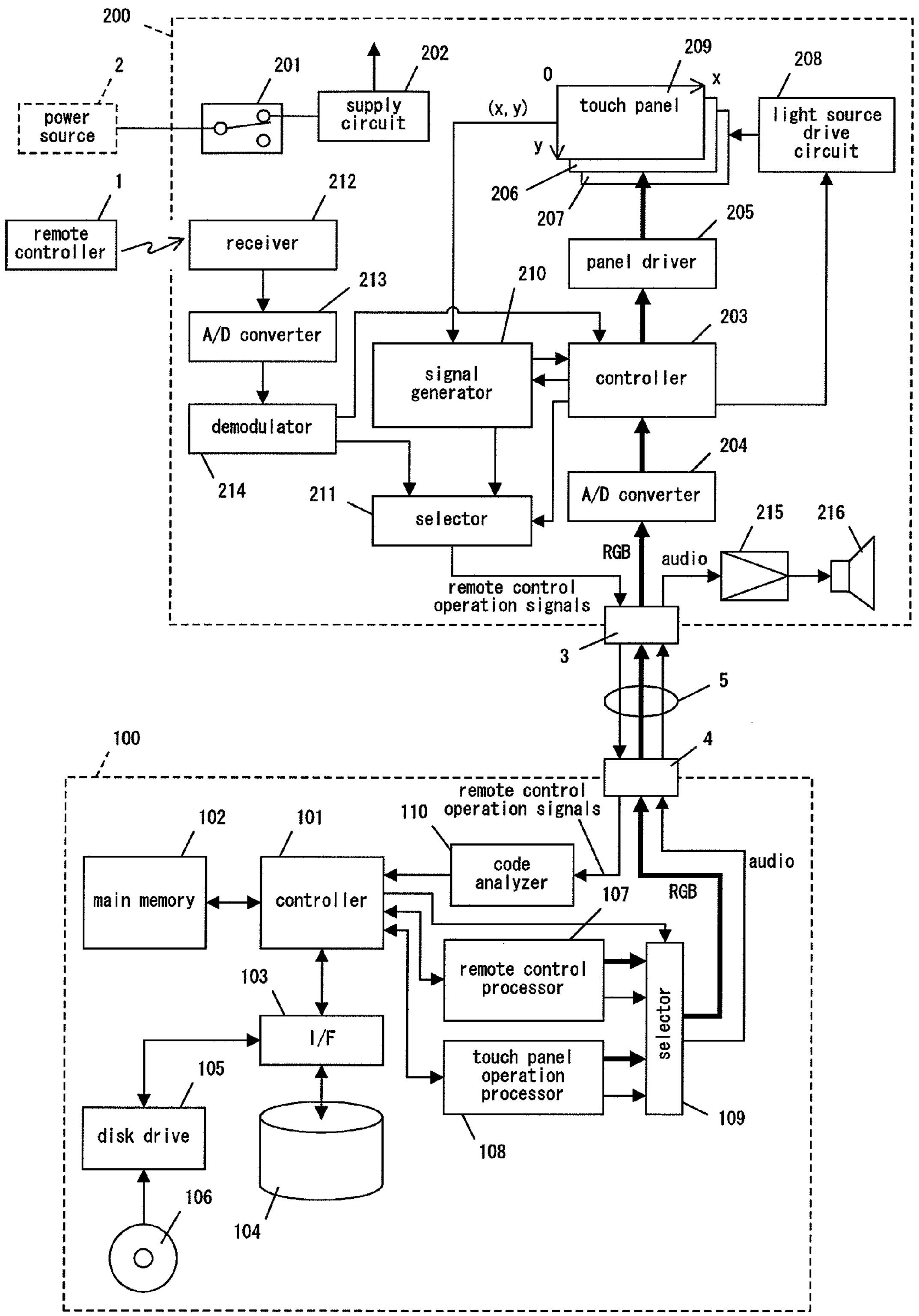
FIG. 2 illustrates a block diagram of a car navigation of the first embodiment.

FIG. 2 illustrates a block diagram of a car navigation of the first embodiment. Referring to FIG. 2, detailed composition of the car navigation apparatus of the first embodiment will be explained.

The main unit 100 has a controller 101 and a main memory 102. The controller 101 controls each part of the main unit 100. A main memory 102 temporarily stores both control programs (refer to FIG. 8) performed by the controller 101 and information required for executing the control program.

An interface 103 connects the controller 101 to both a hard disk 104 and a disk drive 105.

The disk drive 105 drives to read (reproduce) information stored on a removable medium 106 such as a Digital Versatile Disk (DVD) upon setting the removable medium 106. At least one of the hard disk 104 and the recording medium 106 store map information.

A code analyzer 110 connects to a remote control signal communication line of a cable 5. The code analyzer 110 analyzes a remote control signal originating from the cable 5 to determine if the remote control signal is a first remote control signal or a second remote control signal.

The code analyzer 110 extracts a first data field value from the first remote control signal and extracts a two-dimensional coordinate value from the second remote control signal. The first remote control signal, the second remote control signal and each of data field will be explained in detail later.

If the code analyzer 110 determines that the remote control signal is the first remote control signal, the controller 101 instructs a selector 109 to select a remote control processor 107, and instructs the remote control processor 107 to perform remote control processing depending on the remote control signal.

As a result, the remote control processor 107 performs the remote control processing to output both image signals (e.g., RGB-signals) and audio signals to the selector 109. The selector 109 transmits the image signals and the audio signals from the connector 4 to the connector 3 of the display apparatus 200 through the cable 5.

If the code analyzer 110 determines that the remote control signal is the second remote control signal, the controller 101 instructs a selector 109 to select a touch panel operation processor 108, and instructs the touch panel operation processor 108 to perform a touch panel processing depending on the remote control signal.

As a result, the touch panel operation processor 108 performs the touch panel processing to output both image signals (e.g., RGB-signals) and audio signals to the selector 109. The selector 109 transmits the image signals and the audio signals from the connector 4 to the connector 3 of the display apparatus 200 through the cable 5.

A navigation function and the like will not be explained, which relate to either a function of the remote control processor 107 or a function of the touch panel operation processor 108. That is because these functions themselves are not so important to implement the present invention.

The display apparatus 200 has a power switch 201 and a supply circuit 202. The power switch 201 connects to the power source 2 for connecting or disconnecting the power source 2 to the supply circuit 202. Upon turning on the power switch 201, the supply circuit 202 supplies the predetermined electric power to each element both of the display apparatus 200 and the main unit 100.

A controller 203 controls each element of the display apparatus 200. An A/D converter 204 digitizes image signals inputted into the connector 3 for outputting to the controller 203. A panel driver 205 drives the display panel 206 in response to the digitized image signals. Moreover, the controller 203 suitably controls a light source drive circuit 208 to illuminate the display panel 206 with backlight of a light source 207.

After an amplifier 215 amplifies audio signals, a loudspeaker 216 converts amplified audio signals into sounds.

A receiver 212 is placed for receiving a remote control signal from the remote controller 1. A remote control type is as follows: an infrared radiation type, an electric wave type, etc. An A/D converter 213 digitizes a remote control signal received by the receiver 212, for outputting to a demodulator 214.

The demodulator 214 demodulates the digitized remote control signal (the first remote control signal) and error-corrects the demodulated remote control signal. After error correcting, the demodulator 214 conveys completion of the demodulation to the controller 203 and outputs the demodulated first remote control signal to the selector 211. The receiver 212, the A/D converter 213 and the demodulator 214 are configured to receive the first remote control signal.

The A/D converter 213 will not be required if the remote controller 1 sends digitized remote control signal.

The controller 203 instructs the selector 211 to select the demodulator 214 if the completion is conveyed from the demodulator 214. After selecting, the first remote control signal, which is demodulated by the demodulator 214, is outputted from the demodulator 214 to the connector 4 of the main unit 100 via the selector 211, the connector 3 and the cable 5.

The touch panel 209, placed on the display panel 206, outputs a two-dimensional coordinate value signal to a signal generator 210 in response to touch.

The signal generator 210 generates a second remote control signal (explained in detail later) from the two-dimensional coordinate value signal. The second remote control signal is not overlapping the first remote control signal. After generating, the signal generator 210 conveys completion of generation to the controller 203 and outputs the generated second remote control signal to the selector 211. The controller 203 instructs the selector 211 to select the signal generator 210 if the completion is conveyed from the signal generator 210. After selecting, the second remote control signal is outputted from the signal generator 210 to the connector 4 of the main unit 100 via the selector 211, the connector 3 and the cable 5.

It will be recognized that both the first remote control signal and the second remote control signal are transmitted via the remote control signal communication line of the cable 5.

Figure 3:
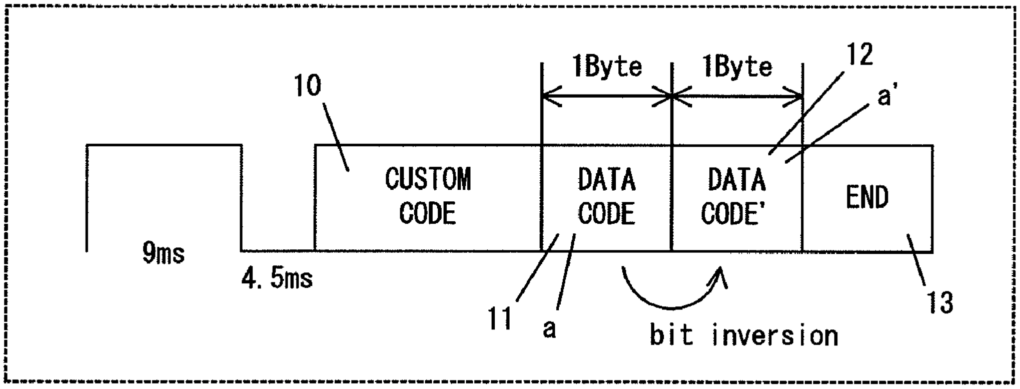
FIG. 3 illustrates a data structure of a first remote control signal of the first embodiment.

FIG. 3 illustrates a data structure of a first remote control signal of the first embodiment. Referring to FIG. 3, the first remote control signal will be explained. The remote control signal includes a header (9 ms interval and 4.5 ms interval), custom code field 10, first data code field 11, a second data code field, and end code field 13. The custom code field 10, the first data code field 11, the second data code field 12, and the end code field 13 are placed in this order from side of the header.

The custom code field 10 usually stores a value indicating a company name, a product code, etc.

The first data code field 11 stores a data code used for identifying remote control command (command data code). The second data code field 12 stores a bit-inversion data gained by bit-inverting the command data code.

The bit-inversion data is used to error-correct the command data code. If a data gained by bit-inverting the bit-inversion data is equal to the command data code (there is no error in transmitting of the first remote control signal), the remote control processing is executed. The end code field 13 stores a code indicating a footer of the remote control signals.

Figure 4:
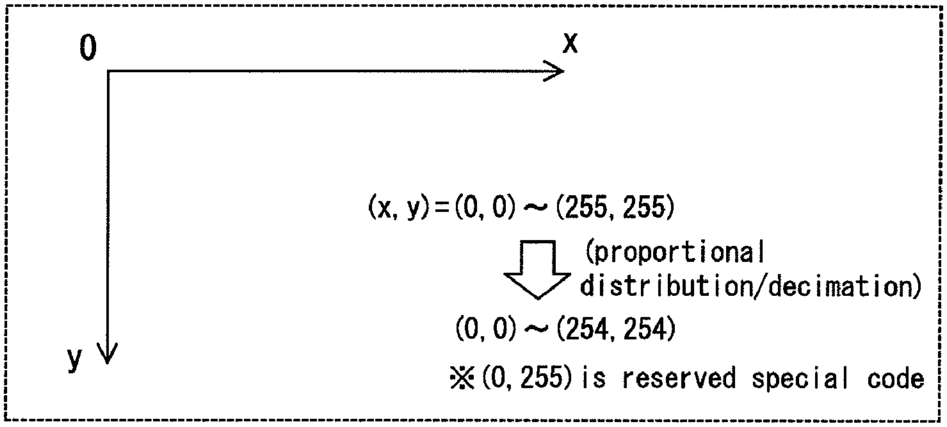
FIG. 4 illustrates a touch panel coordinate of the first embodiment.

FIG. 4 illustrates a touch panel coordinate of the first embodiment. In this embodiment, a pair of numbers (x, y) represents a point in x-y coordinate of the touch panel 209. Each of x-coordinate value and y-coordinate value are indicated with eight-bit data (i.e., $0 \leqq x \leqq 255$; $0 \leqq y \leqq 255$).

The x-y coordinate value (0, 255) is not stored to use the y-coordinate value "255" for a reserved special code. Therefore, the range "$0 \leqq x \leqq 255$" is changed into range "$0 \leqq x \leqq 254$". The range "$0 \leqq y \leqq 255$" is changed into range "$0 \leqq y \leqq 254$".

This change is implemented by: taking away any one of the x-y coordinate value for shifting value "255" into value "254"; equally relocating the x-y coordinate value from the range "$0 \leqq x \leqq 255$ and $0 \leqq y \leqq 255$" to the range "$0 \leqq x \leqq 254$ and $0 \leqq y \leqq 254$".

Figure 5:
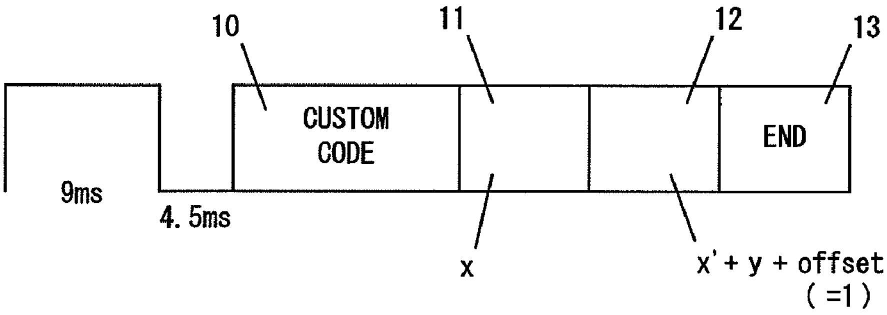
FIG. 5 illustrates a data structure of a second remote control signal of the first embodiment.
Figure 6:
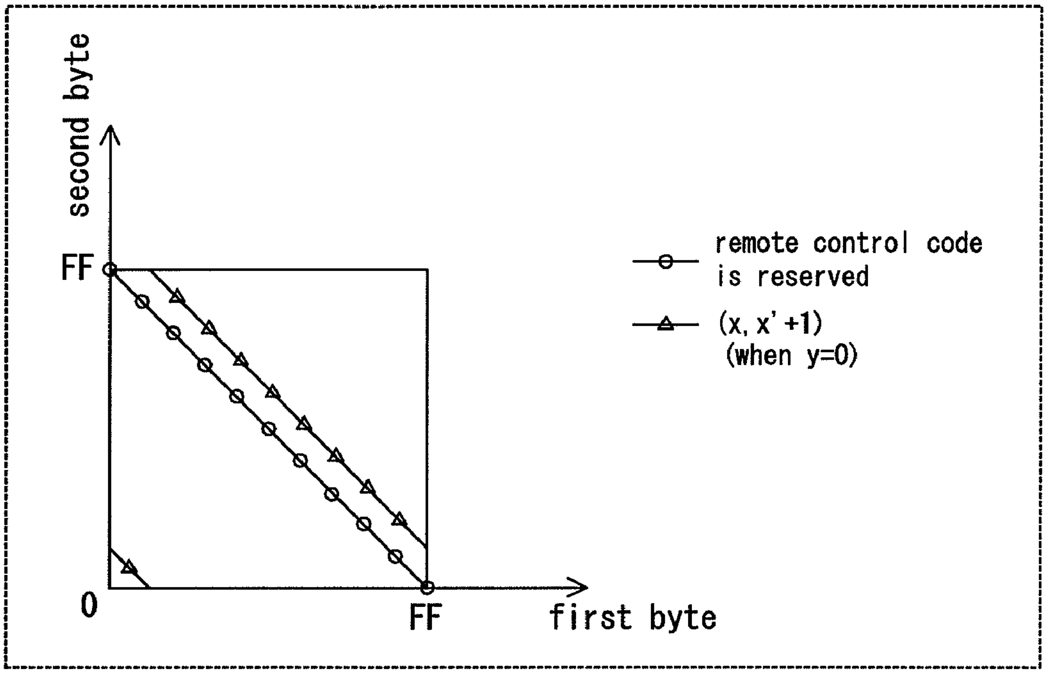
FIG. 6 is a graph of assignment distribution related to the remote control operation signal of the first embodiment.

Referring to FIGS. 5 and 6, the second remote control signal will be explained. FIG. 5 illustrates a data structure of a second remote control signal of the first embodiment. As understood comparing FIG. 5 with FIG. 3, the first data code field 11 and the second data code field 12 store respectively data which differs between the first remote control signal and the second remote control signal. On the other hand, other fields store respectively data being same between the first remote control signal and the second remote control signal.

In the second remote control signal, the first data code field 11 stores x coordinate value of the touch panel coordinate value. The second data code field 12 stores sum "x'+y+1". The "x'" is gained by bit-inverting the x coordinate value. The "1" is value for offset, which can be changed into other value.

FIG. 6 is a graph of assignment distribution related to the remote control operation signal of the first embodiment. FIG. 6 is a graph of assignment distribution related to the remote control operation signal of the first embodiment. By plotting a value of the first data code field 11 to an abscissa shown in FIG. 6 and plotting a value of the second data code field 12 to an ordinate shown in FIG. 6, the first remote control signal is defined as a group of points existing on a diagonal connecting a first endpoint (0, FF) and a second endpoint (FF, 0) in hexadecimal. "First portion" is defined as a group of points existing on the diagonal, in a plane consisting of the abscissa and the ordinate.

In other words, second portion, which is defined as the plane except for the first portion, is never used for a remote control signal of the remote controller 1. The inventor found out utilizing the second portion for the touch panel operation and completed the invention.

In the above, the second data code field 12 is to store sum "x'+y+1". Therefore, the sum "x'+y+1" is never equal to the "x'" gained by bit-inverting the x coordinate value.

The second portion is defined arbitrarily if the second portion is overlapping the first portion. For example, the second data code field 12 will usually store the y coordinate value. If the y coordinate value is equal to the "x'" gained by bit-inverting the x coordinate value, the y coordinate value is changed into other values defined on the predetermined table. An index table will be provided for looking up x-y coordinates values. These variations will be included in the invention.

Figure 7:
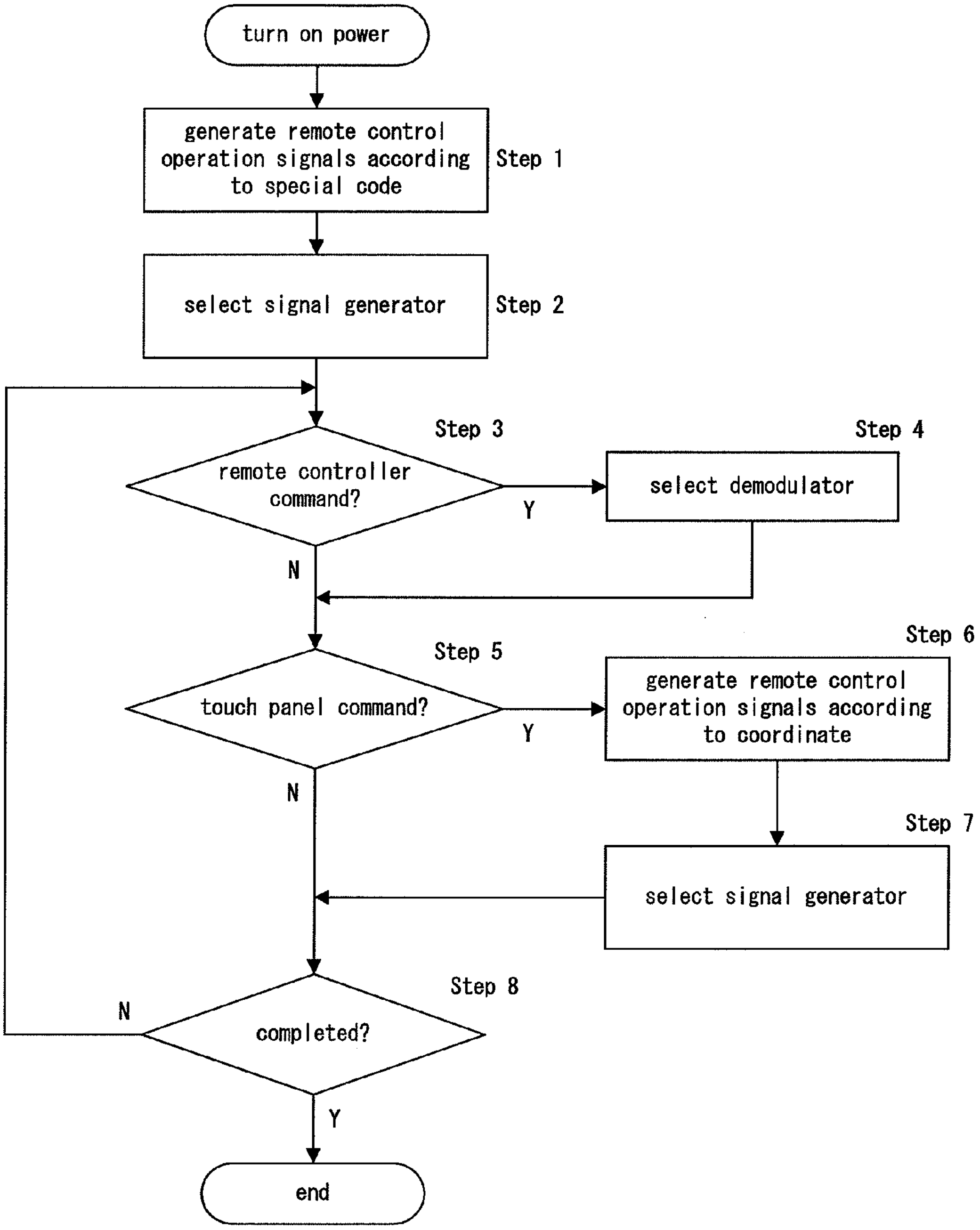
FIG. 7 illustrates a flow chart related to a display apparatus of the first embodiment.

FIG. 7 illustrates a flow chart related to a display apparatus of the first embodiment. Referring to FIG. 7, processes of the display apparatus 200 of the first embodiment will be explained.

Upon turning on the power switch 201, the supply circuit 202 supplies the electric power. At Step 1, the signal generator 210 generates the second remote control signal including the reserved special code. This code is indicated by x-y coordinate value (0, 255). After generating, the signal generator 210 conveys completion of generation to the controller 203. At Step 2, the controller 203 instructs the selector 211 to select the signal generator 210. After selecting, the second remote control signal including the special code is outputted to the connector 4 of the main unit 100 via the selector 211, the connector 3 and the cable 5.

If the completion is conveyed from the demodulator 214, at Step 4, the controller 203 instructs the selector 211 to select the demodulator 214. After selecting, the first remote control signal is outputted from the demodulator 214 to the connector 4 of the main unit 100 via the selector 211, the connector 3 and the cable 5. After that, a process of Step 5 is executed. If the completion is not conveyed, the controller 203 executes a process of the step 5.

After the controller 203, at Step 5, receives interrupt coming from the signal generator 210, at Step 6, the signal generator 210 generates the second remote control signal from the two-dimensional coordinate value signal. At Step 7, the controller 203 instructs the selector 211 to select the signal generator 210. After selecting, the second remote control signal is outputted from the signal generator 210 to the connector 4 of the main unit 100 via the selector 211, the connector 3 and the cable 5. After that, a process of Step 8 is executed. If the completion is not conveyed, the controller 203 executes a process of the step 8.

At Step 8, the controller 203 executes the processing from the Step 3, except for the process ending case.

Figure 8:
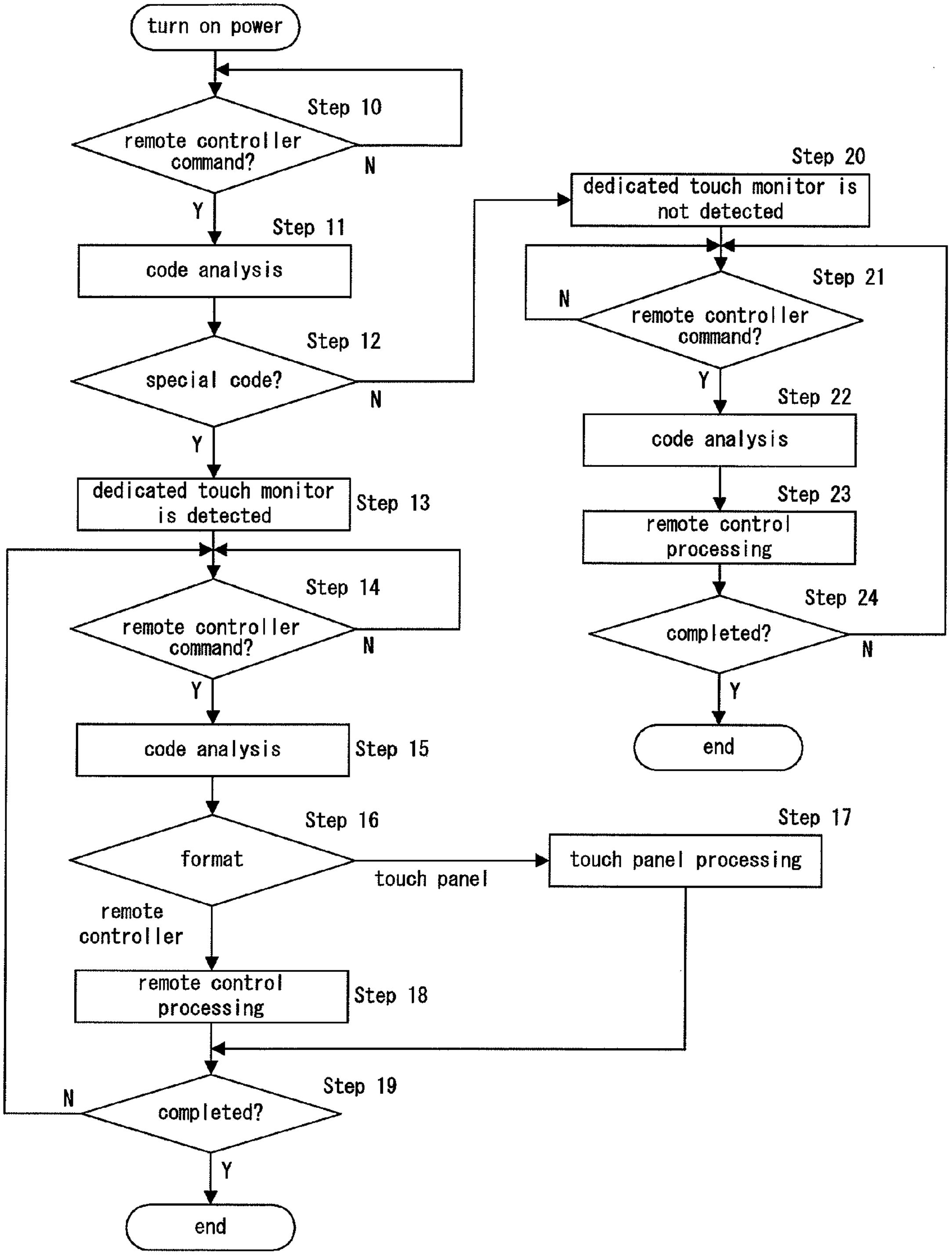
FIG. 8 illustrates a flow chart related to a main unit of the first embodiment.

FIG. 8 illustrates a flow chart related to a main unit of the first embodiment. Referring to FIG. 8, processes of the main unit 100 of the first embodiment will be explained.

Upon turning on the power switch 201, the supply circuit 202 supplies the electric power. At Step 11, the controller 101 is waiting until the remote control signal is received from the display apparatus 200. After receiving, at Step 11, the code analyzer 110 analyzes the remote control signal. At Step 12, the controller 101 checks if the remote control signal is the second remote control signal which includes the special code.

If, at the Step 12, the remote control signal is not the second remote control signal including the special code, at Step 20, the main unit 100 determines that the display apparatus 200 is not a special touch monitor. After determining, the main unit 100 executes only the remote control processing.

In other words, at Step 21 and Step 22, the controller 101 refers to a code analysis result of the code analyzer 110 every time in receiving the first remote control signal. After that, the controller 101 instructs the selector 109 to select the remote control processor 107. At Step 23, the remote control processor 107 executes the remote control processing. Image signals and audio signals, which are generated by the remote control processing, are outputted to the connector 3 of the display apparatus 200 via the selector 109, the connector 4 and the cable 5. These signals are reproduced. The controller 101 repeats processes from Step 21 to Step 24 until the processes are finished.

If, at the Step 12, the remote control signal is the second remote control signal including the special code, at Step 20, the main unit 100 determines that the display apparatus 200 is the special touch monitor. After determining, the main unit 100 executes both the remote control processing and the touch panel operation processing.

After the remote control signal, which is the first remote control signal or the second remote control signal, is received at Step 14, the controller 101, at Step 15, refers to a code analysis result of the code analyzer 110 to check, at Step 16, whether the remote control signal is the first remote control signal or the second remote control signal. In other words, the controller 101 executes this check on the basis of a format of the remote control signal. As mentioned above, there will be no misses of the check because the second remote control signal is not overlapping the first remote control signal. As understood according to above, the reserved special code is information for identifying a model of the apparatus.

If, at the Step 16, the remote control signal is the first remote control signal, at Step 17, the controller 101 instructs the selector 109 to select the remote control processor 107. At Step 18, the remote control processor 107 executes the remote control processing in response to the first remote control signal. Image signals and audio signals, which are generated by the remote control processing, are outputted to the connector 3 of the display apparatus 200 via the selector 109, the connector 4 and the cable 5. These signals are reproduced. The controller 101 executes processes from Step 19.

If, at the Step 16, the remote control signal is the second remote control signal, at Step 17, the controller 101 instructs the selector 109 to select the touch panel operation processor 108. At Step 18, the touch panel operation processor 108 executes the touch panel processing in response to the second remote control signal. Image signals and audio signals, which are generated by touch panel processing, are outputted to the connector 3 of the display apparatus 200 via the touch panel operation processor 108, the selector 109, the connector 4 and the cable 5. These signals are reproduced. The processes are back to the Step 19.

At the Step 19, the controller 101 repeats processes from Step 14 to Step 19 until the processes are finished.

Second Embodiment

Figure 9:
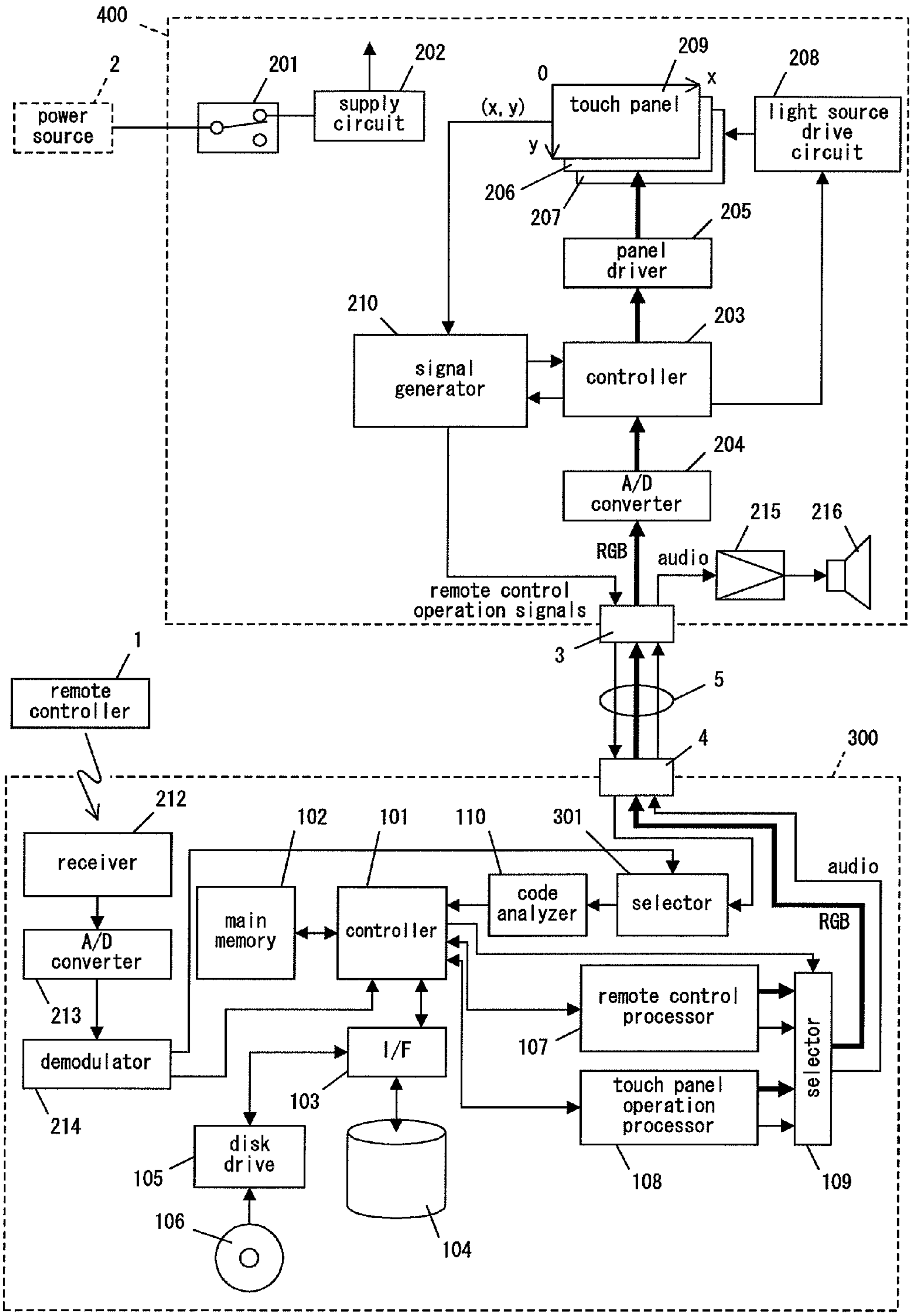
FIG. 9 illustrates a block diagram of a car navigation apparatus of a second embodiment of the present invention.

FIG. 9 illustrates a block diagram of a car navigation apparatus of a second embodiment of the present invention.

As shown in FIG. 9, a car navigation apparatus of the second embodiment separates into a main unit 300 and a display apparatus 400. The main unit 300 can link to the display apparatus 400 mechanically.

The described in hereafter will be only difference from the first embodiment. As understood comparing FIG. 9 with FIG. 2, the receiver 212, the A/D convertor 213 and the demodulator 214, which are configured to receive the remote control signal, are placed in the main unit 300, not placed in the display apparatus 400. Therefore, outputs of the signal generator 210 are directly transmitted to a remote control signal communication line of the connector 3 without by-pass of a selector.

The main unit 300 has a selector 301 that is placed between the connector 4 and the code analyzer 110. The selector 301 selects either a first remote control signal demodulated by the demodulator 214 or a remote control signal inputted into the connector 4, for transmitting one of these signals to the code analyzer 110. To control this selection, the controller 101 outputs a control signal to the selector 301.

Other elements related to the second embodiment are same to those of the first embodiment. Processes of the main unit 300 will not be explained because these processes are same to those of the main unit 100 of the first embodiment.

Figure 10:
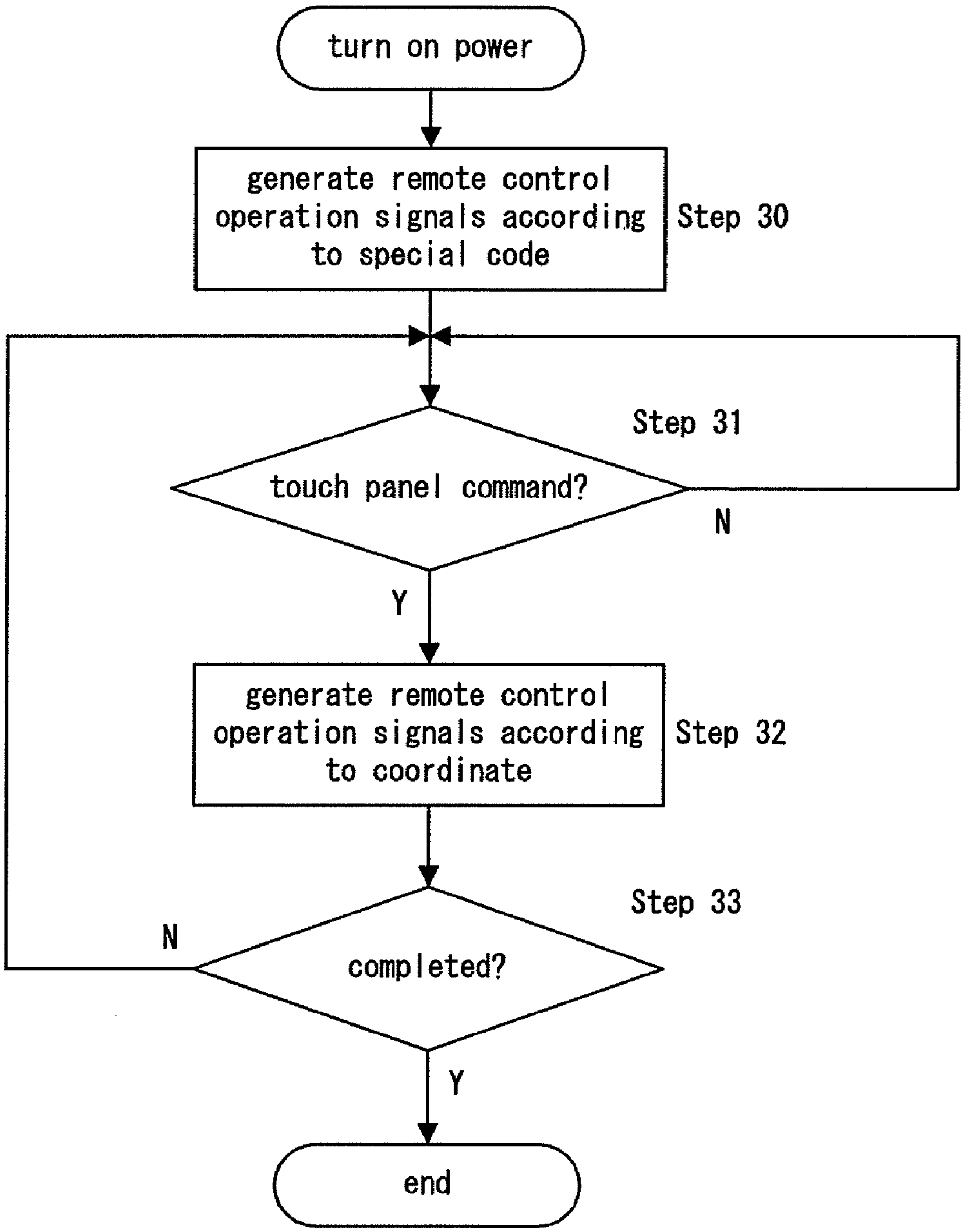
FIG. 10 illustrates a flow chart related to a display apparatus of the second embodiment.

FIG. 10 illustrates a flow chart related to a display apparatus of the second embodiment. Referring to FIG. 10, processes of the display apparatus 400 will be explained. Drawing of FIG. 10 is simpler than that of FIG. 7 because a signal-receiving unit, which is configured to receive the remote control signal, is placed in the main unit 300.

Upon turning on the power switch 201, the supply circuit 202 supplies the electric power. At Step 30, the signal generator 210 generates the second remote control signal including the reserved special code. After generating, the second remote control signal including the special code is outputted to the connector 4 of the main unit 300 via the connector 3 and the cable 5.

At Step 32, the signal generator 210 generates the second remote control signal from the two-dimensional coordinate value signal. If the completion is conveyed from the signal generator 210, at Step 7, the controller 203 instructs the selector 211 to select the signal generator 210. After selecting, the second remote control signal is outputted from the signal generator 210 to the connector 4 of the main unit 100 via the selector 211, the connector 3 and the cable 5. After that, a process of Step 33 is executed. At the Step 33, the controller 203 executes the processing from the Step 31, except for the process ending case.

INDUSTRIAL APPLICABILITY

The present invention relates to an apparatus for using remote control signals and a method for using remote control signals, which will be suitable to a car navigation apparatus and that relation technology field.

The invention claimed is:

1. An apparatus for using remote control signals, comprising:

a display panel;

a touch panel being placed on the display panel, the touch panel outputting a two-dimensional coordinate value signal in response to a touch;

a receiver receiving a first remote control signal from a remote controller;

a signal generator generating a second remote control signal from the two-dimensional coordinate value signal, the second remote control signal not overlapping the first remote control signal;

a code analyzer analyzing a remote control signal originating from the receiver or the signal generator to determine if the remote control signal is the first remote control signal or the second remote control signal;

a remote control processor performing remote control processing depending on the remote control signal, upon the remote control signal being the first remote control signal; and a touch panel operation processor performing a touch panel processing depending on the remote control signal, upon the remote control signal being the second remote control signal, wherein:

the remote control signal includes first one-byte data and second one-byte data;

the first remote control signal exists on a first portion which is defined as a group of points existing on a diagonal of a two-dimensional coordinate consisting of the first one-byte data and the second one-byte data; and the diagonal has a first endpoint consisting of a minimum value of the first one-byte data and a maximum value of the second one-byte data, and has a second endpoint consisting of a maximum value of the first one-byte data and a minimum value of the second one-byte data.

2. An apparatus of claim 1, wherein the first remote control signal has the first one-byte data, and has the second one-byte data used to error-correct the first one-byte data thereof.

3. An apparatus of claim 1, wherein:

the second remote control signal has a set of the first one-byte data and the second one-byte data, which indicates a two-dimensional coordinate value corresponding to the two-dimensional coordinate value signal.

4. An apparatus of claim 3, wherein the second remote control signal is transmitted via a cable.

5. An apparatus of claim 1, wherein the two-dimensional coordinate value signal is corrected to avoid a predetermined special coordinate value which indicates being the second remote control signal.

6. An apparatus of claim 5, wherein the predetermined special coordinate value is a coordinate value indicating an edge portion of the touch panel.

7. An apparatus of claim 5, wherein the predetermined special coordinate value is used in supplying an electric power to the touch panel.

8. A car navigation apparatus comprising:

a display panel;

a touch panel being placed on the display panel, the touch panel outputting a two-dimensional coordinate value signal in response to a touch;

a receiver receiving a first remote control signal from a remote controller;

a signal generator generating a second remote control signal from the two-dimensional coordinate value signal, the second remote control signal not overlapping the first remote control signal;

a code analyzer analyzing a remote control signal originating from the receiver or the signal generator to determine if the remote control signal is the first remote control signal or the second remote control signal;

a remote control processor performing remote control processing depending on the remote control signal, upon the remote control signal being the first remote control signal; and a touch panel operation processor performing a touch panel processing depending on the remote control signal, upon the remote control signal being the second remote control signal, wherein:

the remote control signal includes first one-byte data and second one-byte data;

the first remote control signal exists on a first portion which is defined as a group of points existing on a diagonal of a two-dimensional coordinate consisting of the first one-byte data and the second one-byte data; and the diagonal has a first endpoint consisting of a minimum value of the first one-byte data and a maximum value of the second one-byte data, and has a second endpoint consisting of a maximum value of the first one-byte data and a minimum value of the second one-byte data.

9. A display apparatus, comprising:

a display panel;

a touch panel placed on the display panel, the touch panel outputting a two-dimensional coordinate value signal in response to a touch; and a signal generator generating a second remote control signal from the two-dimensional coordinate value signal, the second remote control signal not overlapping a first remote control signal, wherein:

the remote control signal includes first one-byte data and second one-byte data;

the first remote control signal exists on a first portion which is defined as a group of points existing on a diagonal of a two-dimensional coordinate consisting of the first one-byte data and the second one-byte data; and the diagonal has a first endpoint consisting of a minimum value of the first one-byte data and a maximum value of the second one-byte data, and has a second endpoint consisting of a maximum value of the first one-byte data and a minimum value of the second one-byte data.

10. In an apparatus using a remote control signal, an improvement comprising:

assigning a first remote control signal to a signal of a remote controller;

assigning a second remote control signal to a signal of a touch panel, the second remote control signal not overlapping the first remote control signal; and analyzing a remote control signal to determine if the remote control signal is the first remote control signal or the second remote control signal, wherein:

the remote control signal includes first one-byte data and second one-byte data;

the first remote control signal exists on a first portion which is defined as a group of points existing on a diagonal of a two-dimensional coordinate consisting of the first one-byte data and the second one-byte data; and the diagonal has a first endpoint consisting of a minimum value of the first one-byte data and a maximum value of the second one-byte data, and has a second endpoint consisting of a maximum value of the first one-byte data and a minimum value of the second one-byte data.

* * * * *